United States Patent
Azuma et al.

(10) Patent No.: US 7,934,085 B2
(45) Date of Patent: Apr. 26, 2011

(54) SYSTEM AND METHOD FOR PASSING DATA DIRECTLY FROM APPLICATION TO BIOS

(75) Inventors: Keiichi Azuma, Ohtsu (JP); Tsuneo Heitoh, Shiga-ken (JP); Eiichi Shibata, Nagoya (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1885 days.

(21) Appl. No.: 10/735,332

(22) Filed: Dec. 12, 2003

(65) Prior Publication Data
US 2004/0215850 A1  Oct. 28, 2004

(30) Foreign Application Priority Data
Mar. 13, 2003 (JP) ................................. 2003-067586

(51) Int. Cl.
*G06F 9/00* (2006.01)
*G06F 15/177* (2006.01)
*G06F 1/24* (2006.01)
(52) U.S. Cl. ................................. 713/2; 713/1; 713/100
(58) Field of Classification Search .................. 713/2, 1, 713/100; 709/231, 232; 710/56; 370/357
See application file for complete search history.

(56) References Cited

U.S. PATENT DOCUMENTS

| | | | | | |
|---|---|---|---|---|---|
| 618,122 | A | * | 1/1899 | Berstis | 83/856 |
| 4,829,473 | A | * | 5/1989 | Keller et al. | 341/50 |
| 6,195,749 | B1 | * | 2/2001 | Gulick | 713/1 |
| 6,385,672 | B1 | * | 5/2002 | Wang et al. | 710/56 |
| 6,697,359 | B1 | * | 2/2004 | George | 370/357 |
| 2002/0013852 | A1 | * | 1/2002 | Janik | 709/231 |

FOREIGN PATENT DOCUMENTS
JP  11-345047   12/1999
JP  2001-22346   8/2001

* cited by examiner

*Primary Examiner* — Suresh K Suryawanshi
(74) *Attorney, Agent, or Firm* — Lieberman & Brandsdorfer, LLC

(57) ABSTRACT

Disclosed is an application program which can directly access a transmit buffer of a serial port. Data written into the transmit buffer by the application program is transferred into a receive buffer of the serial port via a switching element. The computer BIOS is enabled to directly access the receive buffer and therefore read the data written by the application program. The state of the switching element may be controlled by the application program to selectively allow data transfer from the transmit buffer to the receive buffer. A jumper plug may be used to create a short circuit between the transmit buffer and the receive buffer instead of closing the switching element.

12 Claims, 3 Drawing Sheets

SYSTEM AND METHOD FOR PASSING DATA DIRECTLY FROM APPLICATION TO BIOS

FIELD OF THE INVENTION

The present invention relates generally to a computer or other computing apparatus and more particularly to an improvement of a computer equipped with a basic input/output system (BIOS).

BACKGROUND OF THE INVENTION

Generally, personal computers (PCs) such as personal computer/advanced technology (PC/AT) machines, as well as other types of PCs, are equipped with a BIOS for controlling peripherals such as a hard disk drive (HDD), a keyboard, a mouse, and a modem. The PC has an operating system (OS) installed thereon and may include various application programs which are executed under the control of the OS.

For transmitting information or data from an application program to the BIOS on a PC, there exist methods in which the application program stores data once into a main memory or an external storage such as an HDD and the BIOS reads the data on startup.

Although a single-task OS (such as a disk operating system (DOS)) environment allows such a direct access from the application program to the main memory, it is simply impractical to make direct memory access available to an application in a multi-task OS environment. This is because the OS would need to be provided with complicated functions such as a system call instruction or an application program interface (API).

In addition, the BIOS cannot practically gain direct access to the external storage in such an environment. In order to do so, it would be necessary to generate a huge amount of preparation programs in the BIOS so as to make file formats specified by the OS readable.

Therefore, what is needed in the art is a PC system and method allowing data to be easily passed directly from an application program to the BIOS, even in a multi-tasking OS environment.

SUMMARY OF THE INVENTION

It is an object of the present invention to provide a computer or computing apparatus capable of passing data from an application program to the BIOS.

In accordance with an aspect of the present invention, there is provided a computer, comprising: an input/output port, an application program, and a BIOS. The input/output port comprises a buffer memory for storing input or output data. The application program writes predetermined data into a buffer memory. The BIOS reads the predetermined data from the buffer memory.

In the computer, the predetermined data is written into the buffer memory by the application program and the written predetermined data is read from the buffer memory. Thereby, the predetermined data can be easily passed from the application program to the BIOS.

Preferably, the input/output port further comprises an input terminal for inputting input data and an output terminal for outputting output data. The buffer memory comprises a receive buffer and a transmit buffer. The receive buffer is connected to the input terminal to store the input data. The transmit buffer is connected to the output terminal to store the output data. The application program writes the predetermined data into the transmit buffer. The BIOS reads the predetermined data from the receive buffer.

In the above, with a short circuit caused between the input terminal and the output terminal by using a jumper plug, the predetermined data is transferred from the transmit buffer to the receive buffer via the short-circuited output terminal and input terminal.

Preferably, the input/output port further comprises a switching element connected between the input terminal and the output terminal. The application program turns on the switching element and transfers the predetermined data from the transmit buffer to the receive buffer.

In the above, the predetermined data is transferred from the transmit buffer to the receive buffer without causing the short circuit between the input terminal and the output terminal by using the jumper plug as set forth above.

More preferably, the input/output port further comprises a control register having a loopback bit. The switching element is turned on or off in response to the loopback bit. The application program sets the loopback bit.

In the above, the predetermined data is transferred from the transmit buffer to the receive buffer only by setting the loopback bit of the control register existing in the input/output port.

DETAILED DESCRIPTION OF THE INVENTION

Figure 1:
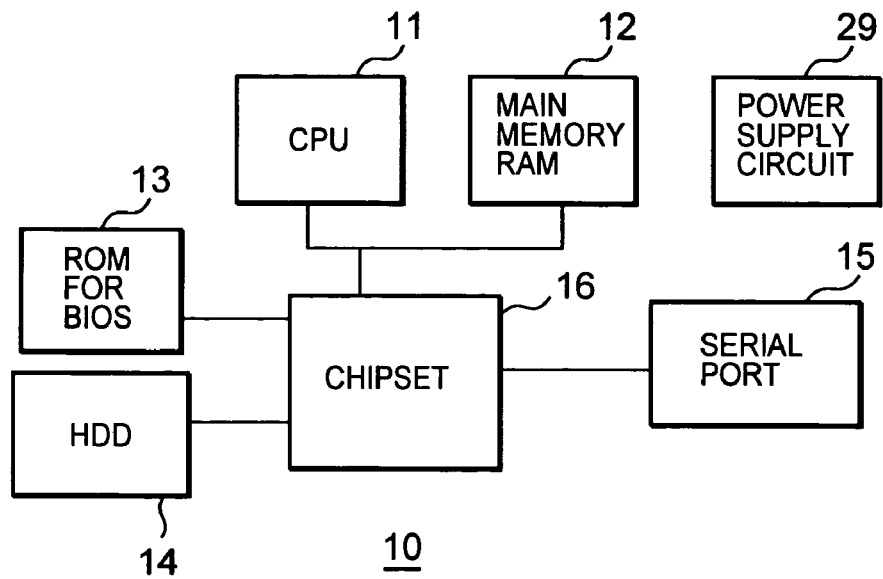
FIG. 1 is a functional block diagram showing the main constitution of a personal computer according to an embodiment of the present invention.

The preferred embodiment of the present invention will now be described in detail hereinafter with reference to the accompanying drawings. The same reference numerals have been retained for identical or corresponding parts in the drawings for citing the descriptions.

Referring to FIG. 1, there is shown a functional block diagram of a main constitution of a PC according to the embodiment of the present invention. As shown in FIG. 1, a PC 10 comprises a central processing unit (CPU) 11, a main memory 12 such as a random access memory (RAM), a read only memory (ROM) 13 storing a BIOS program, a hard disk drive (HDD) 14 storing an OS and application programs, a serial port 15 serially inputting or outputting data, a chipset 16 containing a memory controller and a bus controller, and a power supply circuit 29 supplying power to respective circuits within the PC 10.

Figure 2:
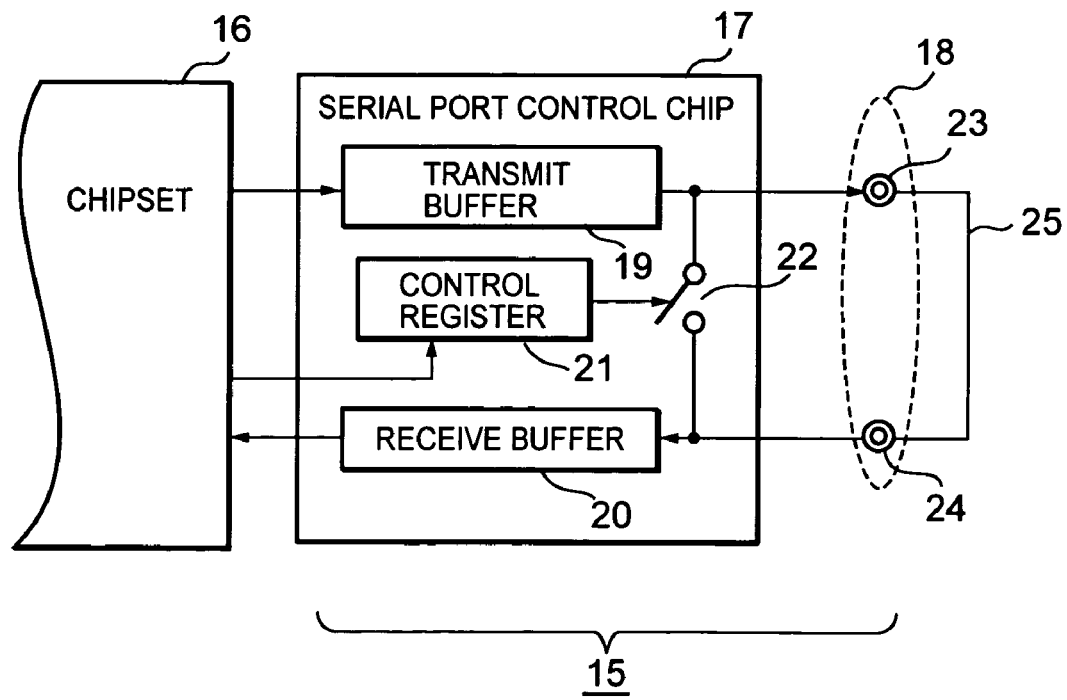
FIG. 2 is a functional block diagram showing details around the serial port of FIG. 1.

Referring to FIG. 2, there is shown a functional block diagram illustrating details around the serial port 15 in FIG. 1. As shown in FIG. 2, the serial port 15 comprises a serial port control chip 17 and a connector 18. The serial port control chip 17 comprises a transmit buffer 19, a receive buffer 20, a control register 21, and a switching element 22. The connector 18 comprises an output terminal 23 and an input terminal 24.

Each of the transmit buffer 19 and the receive buffer 20 comprises, for example, a 16-byte first-in first-out (FIFO) memory. It will be understood that other types or sizes of buffers may be employed with equal success. The transmit buffer 19 sequentially stores data to be output to the outside. The receive buffer 20 sequentially stores data input from the outside. Generally the application program and the BIOS program have direct access to the transmit buffer 19 and the receive buffer 20.

The control register 21 stores several-bit data given by the chipset 16. The switching element 22 is connected between the output terminal 23 and the input terminal 24 and turned on or off in response to a loopback bit of the control register 21. In existing systems, the loopback bit is typically located at bit 3 of the control register 21. If it is set to "1" at an initialization of the serial port 15, the switching element 22 is turned on, by which the data in the transmit buffer 19 is transferred to the receive buffer 20. In existing systems, this loopback function is generally used for testing.

Although many PC/AT machines and other types of PCs include many of the elements discussed above, the BIOS and the application program in this embodiment employ methods and processes absent in existing systems. The following describes details of the processes by giving an example of a case where the PC 10 is applied to a kiosk terminal. The following description is an example only and should not be read as limiting the scope of the present invention which contemplates the direct passing of any type of daa from an application program to the BIOS.

Figure 3:
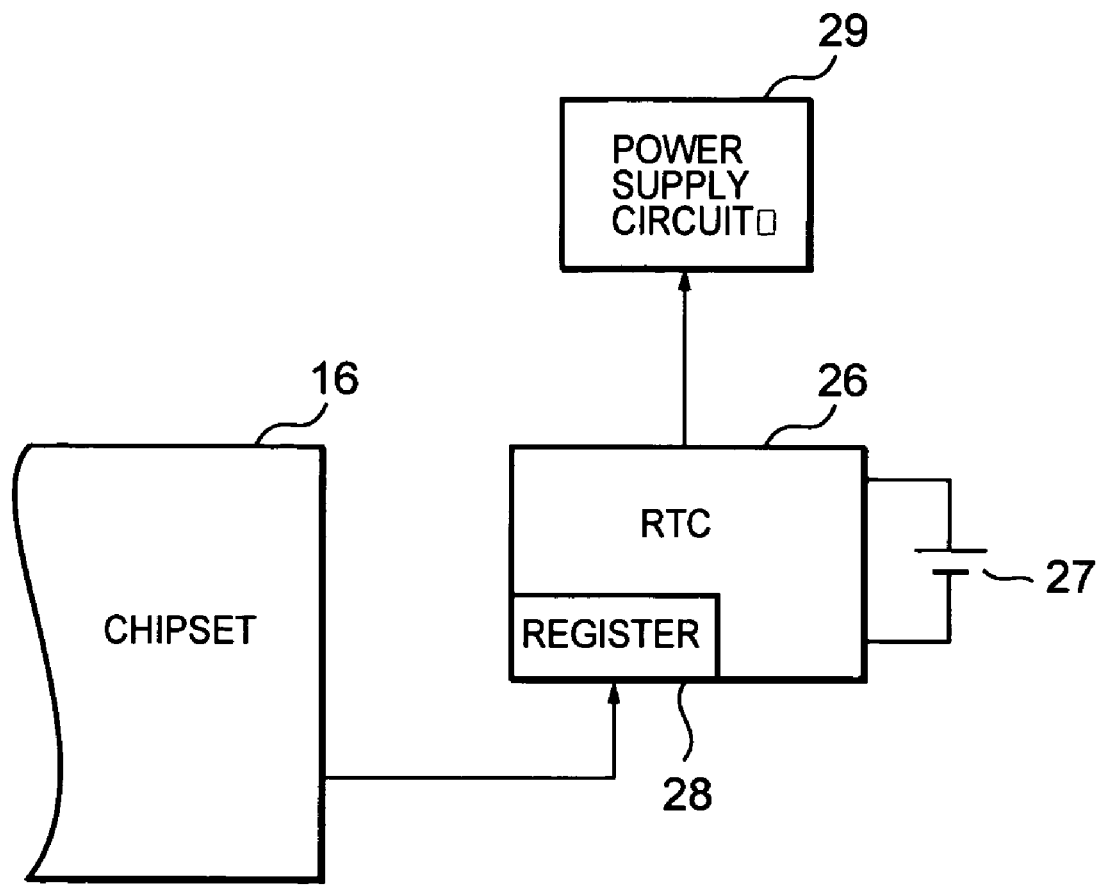
FIG. 3 is a functional block diagram showing a constitution where the personal computer shown in FIG. 1 is applied to a kiosk terminal.

Referring to FIG. 3, there is shown a functional block diagram of a constitution where the PC 10 is applied to the kiosk terminal. As shown in FIG. 3, the PC 10 of the kiosk terminal further comprises a real time clock (RTC) 26 having an automatic wake-up function. The RTC 26 is constantly powered by an internal battery 27. Therefore, the RTC 26 is operating while the power supply of the PC 10 is off. The RTC 26 has an RTC register 28 for setting a desired startup time. When the current time reaches the startup time preset on the RTC register 28, the RTC 26 generates a start signal and gives it to a power supply circuit 29 of the PC 10. The power supply circuit 29 starts to supply power to respective circuits within the PC 10 in response to the start signal. In this manner, the PC 10 of the kiosk terminal is automatically turned on when the current time reaches the preset desired time.

Figure 4:
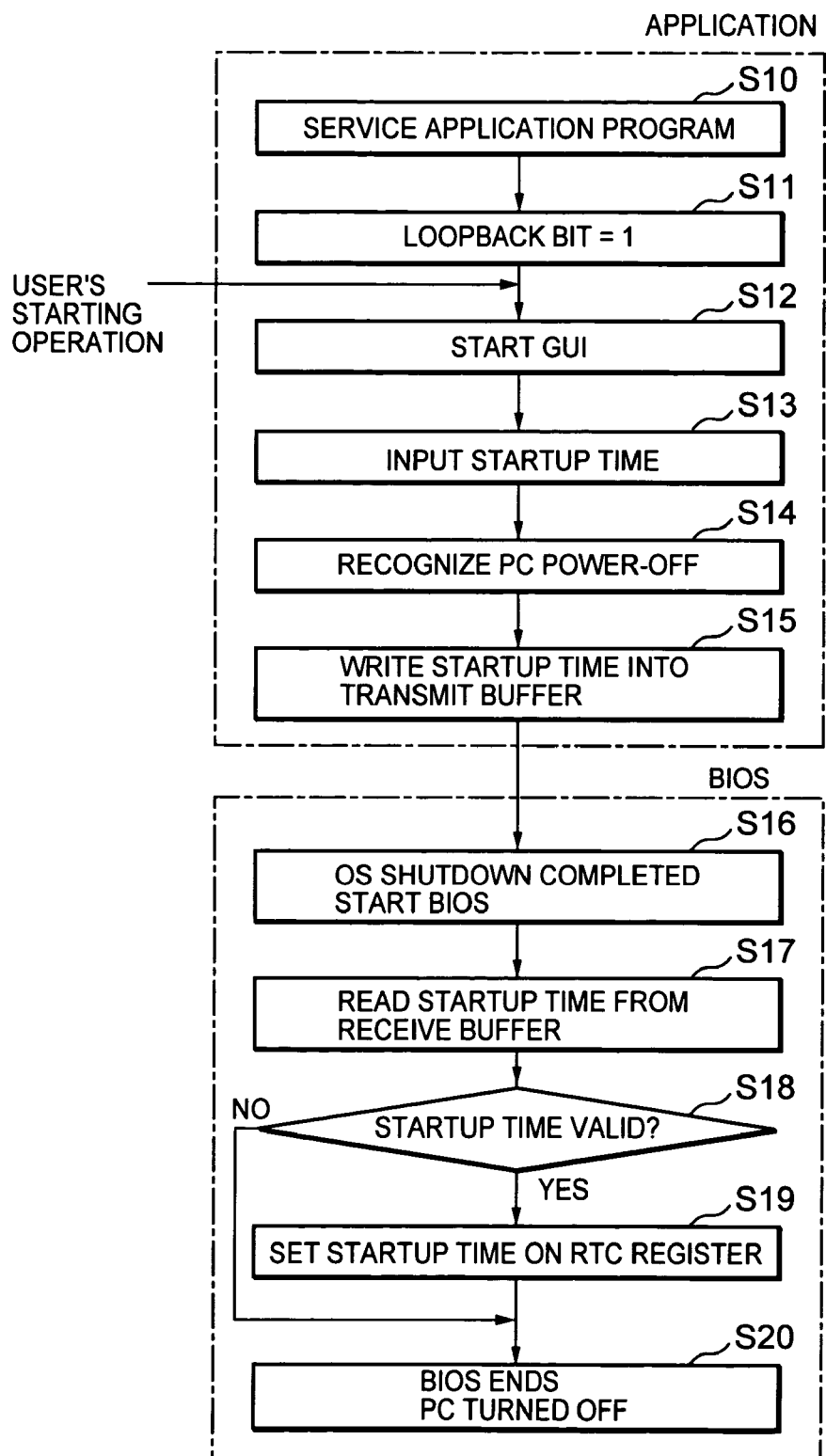
FIG. 4 is a flowchart showing a processing procedure for an application program and a BIOS program executed when the personal computer shown in FIG. 1 is applied to the kiosk terminal.

Referring to FIG. 4, there is shown a flow diagram of a processing procedure of an application program and a BIOS program when the PC 10 is applied to the kiosk terminal. Steps S10 to S15 in FIG. 4 are executed by the application program and steps S16 to S20 are executed by the BIOS program.

Referring to FIG. 4, when the PC 10 is turned on and the OS is started, the OS services the application program, thereby starting basic system functions of the application program (S10).

The serviced application program initializes the serial port 15 and sets the loopback bit of the control register 21 to 1 (S11). The present embodiment could equally use an alternate bit or use a bit setting of 0 to indicate the switch 22 should be closed, as readily recognized by those skilled in the relevant arts. The switching element 22 is turned on in response to the loopback bit. The PC 10 may be provided with various numbers of serial ports 15 (a typical PC/AT machine includes four serial ports generally called COM1 to COM4) and an application program operating in accordance with the present invention specifies one serial port not generally used for other functions.

When the startup time of the RTC 26 is set, a graphical user interface (GUI) function of the application program starts in response to a user's operation (S12). The application program inputs the startup time (for example, "2002/02/25 08:30:00") in response to the user's operation and stores the startup time data in the HDD 14 or the main memory 12 (S13).

When the user completes the work and executes an operation for turning off the PC 10, the serviced application program recognizes the power-off process (S14), resets the transmit buffer 19, transmits the startup time data stored in the step S13 to the serial port 15, and writes it into the transmit buffer 19 (S15). Since the switching element 22 is on at this time, the startup time data is transferred from the transmit buffer 19 to the receive buffer 20. In accordance with other applications of the present invention, the GUI could be used to gather a completely different type of data. As described above, that data would be transmitted to the transmit buffer of the serial port and eventually to the BIOS on start-up, implementing whatever advantageous function may be useful in a given application.

When the OS shutdown is completed, the BIOS program starts (S16). The BIOS program reads the startup time data from the receive buffer 20 (S17). The BIOS program determines whether the read data is valid (S18). Whether it is valid is determined by whether "year," "month," "day," "hour," and "minute," and "second" in the data are within a predetermined range.

If the data is valid, the BIOS program sets the startup time on the RTC register 28 via the chipset 16 (S19). After the startup time is set or if the data is invalid, the BIOS program ends and the PC 10 is turned off (S20).

As set forth hereinabove, according to the embodiment of the present invention, the application program can pass data to the BIOS in an easy and simple method due to a use of the buffers 19 and 20 of the serial port 15 enabling the application program to write data directly and the BIOS to read out data directly.

Additionally, the application program can pass data to the BIOS by changing the existing BIOS only slightly and without a need for changing the OS at all due to the use of a serial port 15 called a legacy port which is provided in almost all existing PCs. Therefore, the OS is not limited to a single-task OS, but can be a multi-task OS.

Furthermore, data is transferred from the transmit buffer 19 to the receive buffer 20 by using the loopback bit provided for testing in the existing serial port, by which the existing serial port can be used directly.

With reference to the example data used above, the startup time in a conventional kiosk can only be set very inconveniently on the BIOS screen. According to the described embodiments of the present invention, however, the startup time can be easily set on the GUI screen of the application program.

Although the loopback bit is used in the above embodiment, a jumper plug 25 for a short circuit between the output terminal 23 and the input terminal 24 may be inserted into the connector 18 as shown in FIG. 2, instead. In the above, the data in the transmit buffer 19 is transferred to the receive buffer 20 via the jumper plug 25 without setting the loopback bit to 1 with the application program.

While the buffers 19 and 20 for the serial port 15 typical as a legacy port are used in the above embodiment, buffers for a parallel port, a personal system/2 (PS/2) port, a universal serial bus (USB) port, or the like can be used instead.

Furthermore, while the embodiment has been described by giving an example of the case where the PC 10 is applied to the kiosk terminal, the present invention is not limited thereto, but it is applicable to all apparatuses that need to pass predetermined data from the application program to the BIOS.

While the embodiment of the present invention has been described hereinabove, the above embodiment is only an exemplification for putting the present invention into practice. Therefore, the present invention is not limited to the above embodiment. On the contrary, the above embodiment can be modified appropriately and put into practice within the spirit and scope of the present invention.

What is claimed is:

1. A computing apparatus comprising:
   an input/output port comprising a buffer memory including a receive buffer for storing input data and a transmit buffer for storing output data;
   an application program for writing predetermined data into said transmit buffer;
   a switchable connection for transmitting said predetermined data from the transmit buffer to the receive buffer; and
   a BIOS for reading said predetermined data from said receive buffer.

2. The computing apparatus according to claim 1, wherein: said receive buffer connected to an input terminal of said input/output port and said transmit buffer connected to an output terminal of said input/output port.

3. The computing apparatus according to claim 2, wherein:
   said application program being further configured to comprise a graphical user interface allowing a user to input said predetermined data.

4. The computing apparatus according to claim 2, wherein:
   said input/output port further comprising a switching element connected between said input terminal and said output terminal; and
   said application program being configured to control said switching element to control the transfer of said predetermined data from said transmit buffer to said receive buffer.

5. The computing apparatus according to claim 4, wherein:
   said input/output port further comprising a control register, said control register comprising a loopback bit;
   said input/output port being configured to open or close said switching element in response to the state of said loopback bit; and
   said application program being configured to control the state of said loopback bit.

6. The computing apparatus according to claim 5, wherein:
   said application program being further configured to comprise a graphical user interface allowing a user to input said predetermined data.

7. A method comprising:
   writing predetermined data into a transmit buffer using an application program operating under the control of an operating system of a computing apparatus, wherein said transmit buffer is connected to an output terminal of an input/output port of said computing apparatus; and
   reading said predetermined data from a receive buffer using a BIOS of said computing apparatus, wherein said receive buffer is connected to an input terminal of said input/output port and wherein said transmit buffer and said receive buffer are operatively connected to allow the passage of the predetermined data therebetween.

8. The method of claim 7, further comprising:
   presenting to a user a graphical user interface;
   accepting from said user, via said graphical user interface, said predetermined data.

9. The method of claim 7 wherein the operative connection between said transmit buffer and said receive buffer comprises a switching element.

10. The method of claim 9 wherein said switching element comprises a jumper plug selectively placed by a user.

11. The method of claim 9 wherein said switching element comprises a switch under the control of said application program.

12. The method of claim 11, further comprising:
    presenting to a user a graphical user interface;
    accepting from said user, via said graphical user interface, said predetermined data.

* * * * *